United States Patent
Mills et al.

(10) Patent No.: US 7,275,331 B2
(45) Date of Patent: Oct. 2, 2007

(54) TOOL FOR INDICATING FLUSHNESS OF SUNROOF PANEL

(75) Inventors: Kevin T. Mills, Sterling Heights, MI (US); Craig A. Rodriguez, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 26 days.

(21) Appl. No.: 11/281,328

(22) Filed: Nov. 17, 2005

(65) Prior Publication Data

US 2007/0107244 A1    May 17, 2007

(51) Int. Cl.
  *G01B 5/25* (2006.01)
  *G01B 5/00* (2006.01)
(52) U.S. Cl. .............................. 33/533; 33/783; 33/613; 33/546
(58) Field of Classification Search .................. 33/533, 33/194, 645, 613, 600, 546, 783, 784
See application file for complete search history.

(56) References Cited

U.S. PATENT DOCUMENTS

| 3,438,135 | A | * | 4/1969 | Bense ........................... 33/600 |
| 3,465,449 | A | * | 9/1969 | Steffens et al. ................ 33/600 |
| 4,345,380 | A | * | 8/1982 | Vis ............................... 33/784 |
| 4,389,786 | A | * | 6/1983 | Sakata et al. .................. 33/561 |
| 4,606,129 | A | * | 8/1986 | Barrowman et al. ..... 33/501.09 |
| 4,831,743 | A | * | 5/1989 | Struble ......................... 33/561 |
| 5,067,250 | A | * | 11/1991 | Auweiler et al. .............. 33/783 |
| 5,551,162 | A | * | 9/1996 | Struble ......................... 33/548 |
| 5,657,550 | A | * | 8/1997 | Struble ......................... 33/548 |
| 6,101,732 | A | * | 8/2000 | Roy et al. ...................... 33/613 |
| 6,138,337 | A | * | 10/2000 | Lezuch et al. ........... 29/407.05 |
| 6,269,546 | B1 | * | 8/2001 | Ventura ........................ 33/645 |
| 6,907,360 | B2 | * | 6/2005 | Gabiniewicz et al. .......... 702/41 |

* cited by examiner

*Primary Examiner*—G. Bradley Bennett
*Assistant Examiner*—Amy R. Cohen

(57) ABSTRACT

A tool for indicating the flushness between a vehicle body roof panel and a sunroof panel that is adjustably mounted within a sunroof opening of the vehicle body roof panel. The tool will signal a vehicle assembly operator in the event that the sunroof panel needs to be vertically adjusted up or down. The tool includes a housing that sits on the roof panel. A lever is pivotally mounted on the housing and has a feeler extending from the housing to contact with the sunroof panel so that the pivotal position of the lever relative the housing is determined by the degree of flushness or lack of flushness between the two panels. An indicator is associated with the lever to indicate to the vehicle assembly operator whether or not the sunroof panel needs vertical adjustment relative to the roof panel to obtain an acceptable degree of flushness.

10 Claims, 3 Drawing Sheets

TOOL FOR INDICATING FLUSHNESS OF SUNROOF PANEL

FIELD OF THE INVENTION

The present invention relates to a tool for indicating the flushness between a vehicle roof panel and a sun roof panel.

BACKGROUND OF THE INVENTION

It is known to mount a sunroof panel within an opening in a vehicle roof panel. The sunroof panel is mounted on the vehicle body by adjusting bolts to permit up and down vertical adjustment of the sun roof panel to achieve a flush fit between the sun roof panel and the roof panel.

SUMMARY OF THE INVENTION

A tool is provided for indicating the flushness between a vehicle body roof panel and a sunroof panel that is adjustably mounted within a sunroof opening of the vehicle body roof panel. The tool will signal a vehicle assembly operator in the event that the sunroof panel needs to be vertically adjusted up or down. The tool includes a housing that sits on the roof panel. A lever is pivotally mounted on the housing and has a feeler extending from the housing to contact with the sunroof panel so that the pivotal position of the lever relative the housing is determined by the degree of flushness or lack of flushness between the two panels. An indicator is associated with the lever to indicate to the vehicle assembly operator whether or not the sunroof panel needs vertical adjustment relative to the roof panel to obtain an acceptable degree of flushness Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

Figure 1:
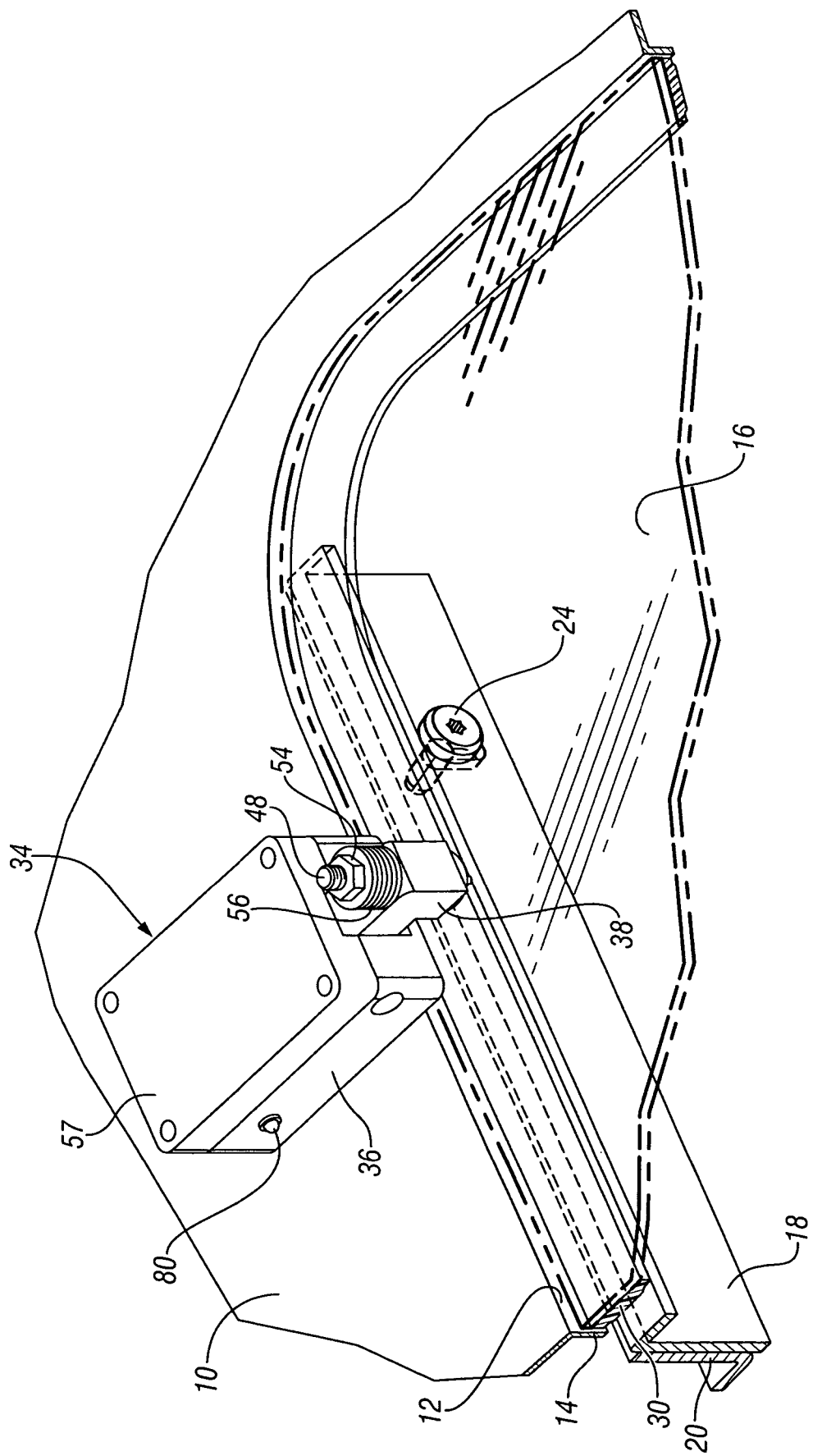
FIG. 1 is a partial perspective view of a vehicle body roof showing the tool of this invention resting on the vehicle body roof panel and a lever mounted feeler contacting the sunroof panel.
Figure 3:
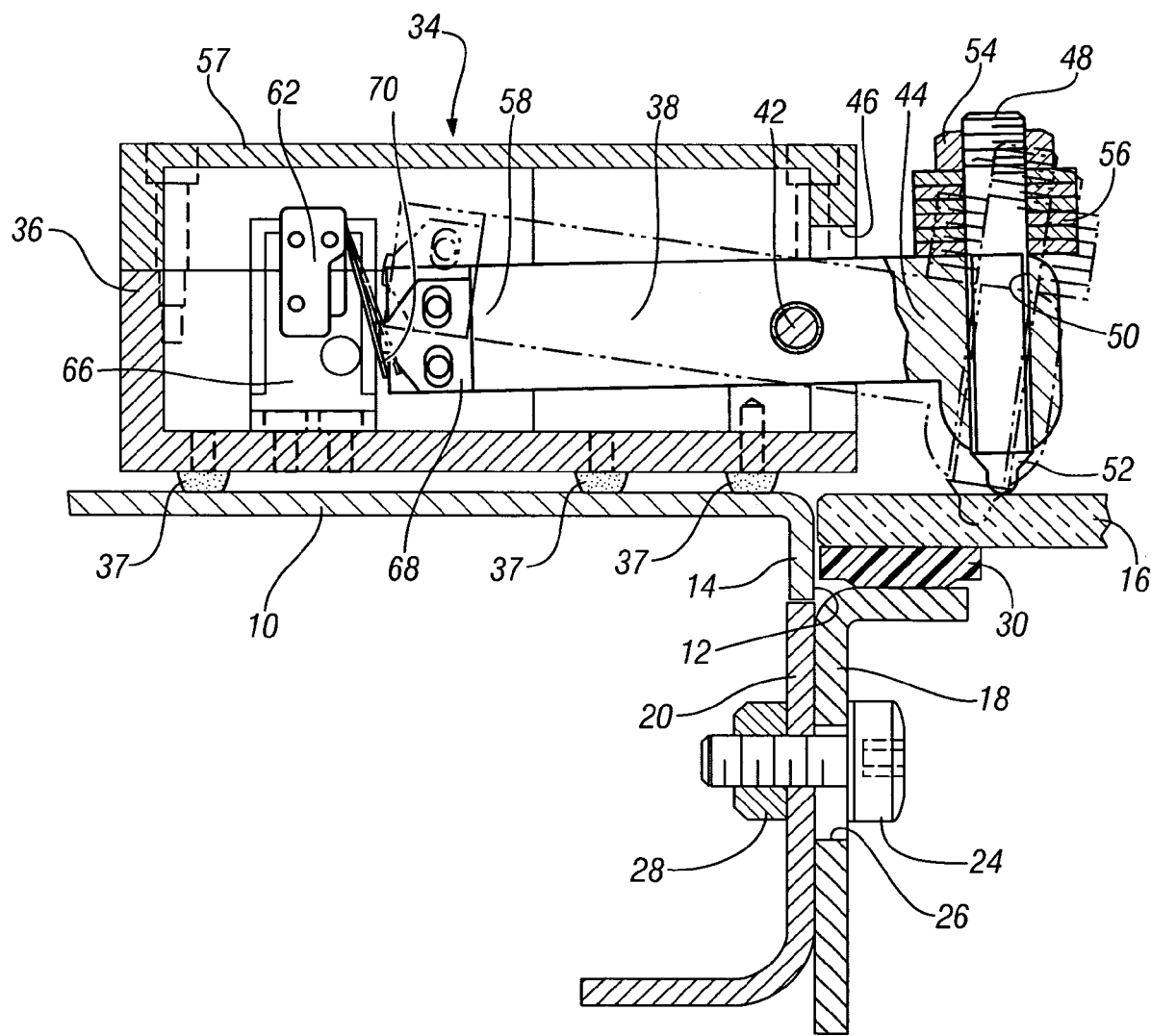
FIG. 3 is a side elevation view of the tool, having parts broken away and in section.

As seen in FIGS. 1 and 3, a vehicle body roof panel 10 has a roof opening 12 defined by a downturned flange 14 of the roof panel 12.

A glass sunroof panel 16 is mounted in the roof opening 12 by a sunroof mounting bracket 18 that is adjustably connected to a roof panel bracket 20 by a bolt 24. The bolt 24 extends through a slot 26 in the sunroof mounting bracket 18 and is threaded into a nut 28 welded in place on the roof panel bracket 20. A continuous bead of adhesive sealer 30 acts between the sunroof panel 16 and the sunroof mounting bracket 18.

During the assembly of the vehicle, a vehicle assembly operator, or preferably an operator positioned on each side of the vehicle, adjusts the sunroof panel 16 up and down to a flush condition with the roof panel 10 and then tightens the bolt 24. A number of these adjusting bolts 24 are provided at various points around the periphery of the roof opening 12. The sunroof panel 16 can be either glass or a metal panel. Further, the sunroof panel 16 can be mounted on the roof bracket 20 by a powered track mechanism for moving the sunroof panel between open and closed positions.

A flushness indicating tool, generally indicated at 34, includes a box shaped housing 36 with rubber feet 37 for sitting on the painted surface of the roof panel 10. A lever 38 is mounted on the housing 36 by a pivot bolt 42. Lever 38 has a first end 44 that reaches through an opening 46 in the housing 36. A feeler 48 is threaded into a bore 50 in the first end 44 of the lever 38 and has a feeler tip 52 for contacting with the sunroof panel 16. A nut 54 is threaded onto the upper end of the feeler 48 and retains weights 56. The housing 36 has a cover 57.

Figure 2:
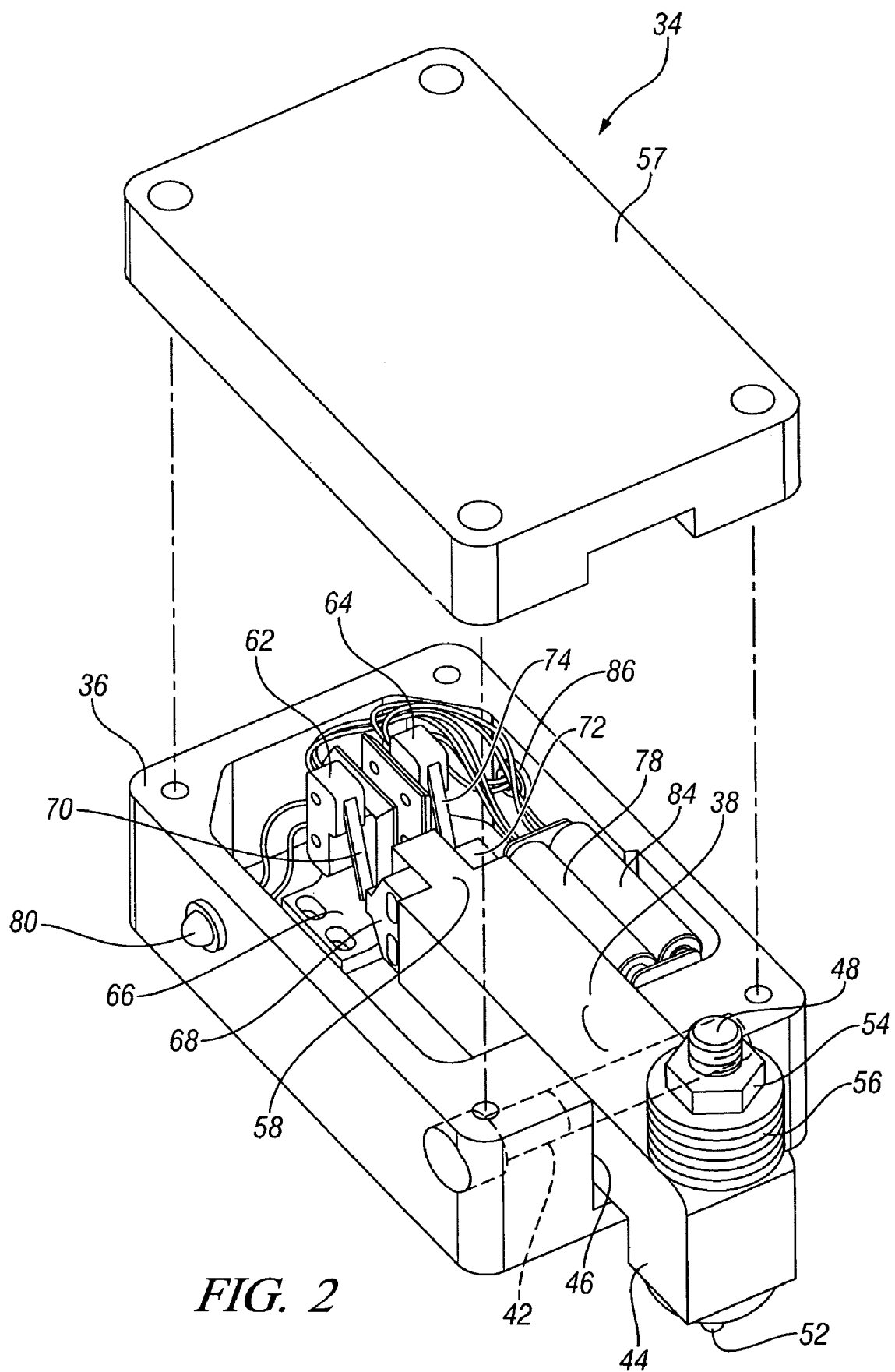
FIG. 2 is an exploded perspective view of the tool.

As best seen in FIGS. 2 and 3, lever 38 has a second end 58 positioned within the housing 36 for operating micro switches 62 and 64 that are mounted side by side on a switch mounting bracket 66. A switch operator 68 is mounted on the lever 38 by adjusting screws, not shown, and engages with an arm 70 of the micro switch 62 so that up and down movement of the switch operator 68 upon pivoting movement of the lever 38 will operate the micro switch 62. A similar switch operator 72 is mounted on the lever 38 by adjusting screws, not shown, and engages with an arm 74 of the micro switch 64 so that up and down movement of the switch operator 72 upon pivoting movement of the lever 38 will operate the micro switch 64.

Micro switch 62 is electrically connected to a battery 78 and a signal light 80. Micro switch 64 is electrically connected to a battery 84 and a signal light.

Referring again to FIGS. 1 and 3, it is seen that the housing 34 sits on the roof panel 10 adjacent the front edge of the sun roof panel 16 with the feeler tip 52 contacting the sun roof panel 16. If the sun roof panel 16 is either too high or too low, the signal light 80 will not be illuminated and thereby tell the vehicle assembly operator to adjust the height of the sunroof panel 16 as permitted by loosening of the bolt 24 and vertically adjusting the height of the sunroof panel mounting bracket 18. When the signal light 80 is illuminated, the vehicle assembly operator knows that the front edge of the sun roof panel 16 has reached a proper degree of flushness with the roof panel and the bolt 24 can be tightened.

It will be understood that most vehicle roof panels may have different curvatures at the front and rear. For this reason, the tool 34 provides a first signal light 80 that is relied upon in adjusting the front of the sunroof panel 16 and a second signal light 86 that is relied upon in adjusting the rear of the sunroof panel. The switch operators 68 and 72 are adjusted on the lever 38 so that micro switch 62 is properly calibrated for the use of the tool 34 at the front of the sunroof and the micro switch 64 is calibrated for the use of the tool 34 at the rear of the sunroof panel. Furthermore, it will be appreciated that the accuracy of the tool 34 can be calibrated and maintained by adjusting the feeler 48 up and down within the lever 38.

Thus, it is seen that the tool assists the vehicle assembly operator in adjusting the position of the sunroof panel to an acceptable degree of flushness with the roof panel.

The foregoing description of the invention is merely exemplary in nature and, thus, variations thereof are intended to be within the scope of the invention. For example, the flushness indicator is not limited to being a signal light, but may any visual or audible signally device, such as a buzzer or horn. In addition, it may be desirable to employ two separate tools, one for adjusting the front of the sunroof panel and one for the rear of the sunroof panel, as opposed to having the two separate switches and signal lights as shown in the drawings.

What is claimed is:

1. A single tool for measuring the condition of desired flushness between the vehicle body roof panel and the front of a vertically adjustable sunroof panel and a different condition of flushness between the vehicle body roof panel and the rear of the vertically adjustable sunroof panel, comprising:
   a housing adapted to rest upon the roof panel adjacent either the front of the sunroof panel or the rear of the sunroof panel;
   a lever pivotally mounted on the housing and having a first end extending from the housing to overlie the adjacent front or rear of the sunroof panel when the housing is rested upon the roof panel;
   a feeler provided on the first end of the housing and contacting the adjacent front or rear of sunroof panel, so that the second end of the of the lever is moved vertically up and down in relation to the vertical position of the sunroof panel relative to the roof panel;
   a first switch and a second switch mounted on the housing, said first switch being calibrated to operate in response to movement of the second end of lever upon the feeler contacting the front of the sunroof panel and the second switch being calibrated to operate in response to movement of the second end of the lever upon the feeler contacting the rear of the sunroof panel,
   a first signal device operated by the first switch to trigger a signal indicating that the front of the sunroof panel is either flush with the roof panel and not needing adjustment or not flush with the roof panel and needing adjustment and a second signal device operated by the second switch to trigger a signal indicating that the rear of sunroof panel is either flush with the roof panel and not needing adjustment or not flush with the roof panel and needing adjustment.

2. The tool of claim 1 in which resilient feet are provided on the housing to protect the roof panel from injury by the housing.

3. The tool of claim 1 in which the signaling devices are signal lights.

4. The tool of claim 1 in which the feeler is adjustably mounted on the lever to enable calibration of the tool.

5. The tool of claim 1 further comprising said first and second signal devices being signal lights that are mounted on opposite sides of the housing.

6. The tool of claim 1 in which the second end of the lever carries first and second switch operators that are adjustably mounted on the second end of the lever and engage respectively with and operate the first and second switches.

7. A single tool for measuring and signaling the different conditions of desired flushness between the vehicle body roof panel and the front of a vertically adjustable sunroof panel and between the vehicle body roof panel and the rear of the vertically adjustable sunroof panel, comprising:
   a housing adapted to rest upon the roof panel adjacent either the front of the sunroof panel or the rear of the sunroof panel;
   a lever pivotally mounted on the housing and having a first end extending from the housing to overlie the adjacent front or rear of the sunroof panel when the housing is rested upon the roof panel;
   a feeler provided on the first end of the housing and contacting the adjacent front or rear of sunroof panel, so that the second end of the of the lever is moved vertically up and down in relation to the vertical position of the sunroof panel relative to the roof panel;
   a first switch operator carried by the second end of the lever and a second switch operator carried by the second end of the lever, said first and second switch operators being separately adjustable on the second end of the lever to calibrate the tool so that one switch operator is calibrated to the condition of flushness desired at the front of the sunroof panel and the second switch operator is calibrated to the condition of flushness desired at the rear of the sunroof panel;
   a first switch mounted on the housing and being operated by the first switch operator and a second switch mounted on the housing and being operated by the second switch operator;
   a first signal device operated by the first switch to trigger a signal indicating that the sunroof panel is either flush with the roof panel and not needing adjustment or not flush with the roof panel and needing adjustment and a second signal device operated by the second switch to trigger a signal indicating that the sunroof panel is either flush with the roof panel and not needing adjustment or not flush with the roof panel and needing adjustment.

8. The tool of claim 7 in which the feeler is adjustably mounted on the lever.

9. The tool of claim 7 in which resilient feet are provided on the housing to protect the roof panel from injury by the housing.

10. The tool of claim 7 in which the signaling devices are first and second signal lights that are mounted on opposite side of the housing.

* * * * *